F. A. KRUSEMARK, L. G. FUNKHOUSER AND H. G. CARPENTER.
CUSHION TIRE.
APPLICATION FILED MAR. 11, 1918.
1,344,346. Patented June 22, 1920.
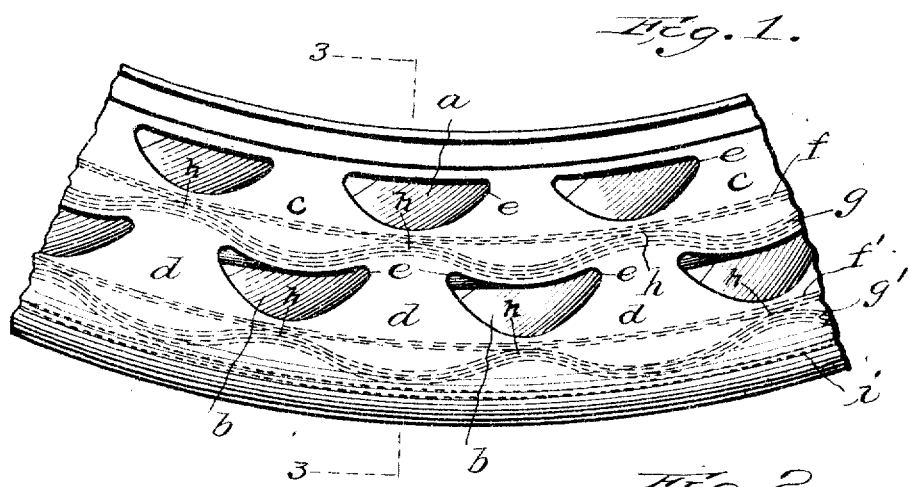
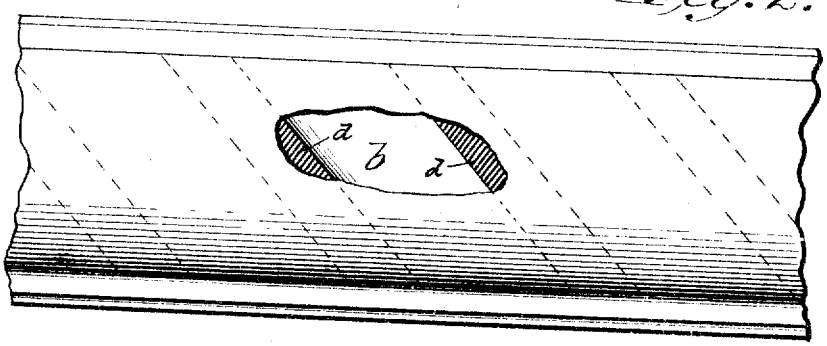
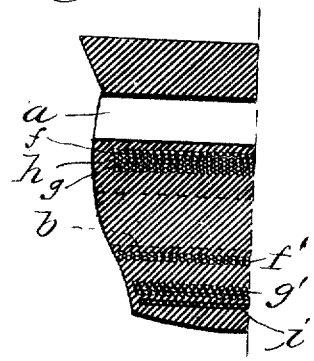
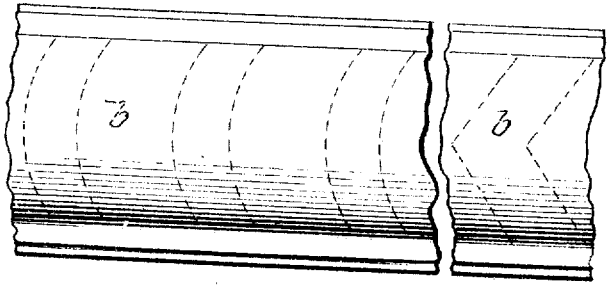

UNITED STATES PATENT OFFICE.

FREDERICK AUGUSTUS KRUSEMARK, LUTHER G. FUNKHOUSER, AND HARRY G. CARPENTER, OF ROANOKE, VIRGINIA, ASSIGNORS TO K. F. & C. TIRE & RUBBER CORPORATION, OF ROANOKE, VIRGINIA, A CORPORATION OF VIRGINIA.

CUSHION-TIRE.

1,344,346.  Specification of Letters Patent.  Patented June 22, 1920.

Application filed March 11, 1918. Serial No. 221,705.

*To all whom it may concern:*

Be it known that we, FREDERICK A. KRUSEMARK, LUTHER G. FUNKHOUSER, and HARRY G. CARPENTER, citizens, respectively, of the United States of America, and residents, respectively, of Roanoke, county of Roanoke, State of Virginia, have invented certain new and useful Improvements in Cushion-Tires, of which the following is a full and clear specification.

The objects of this invention are to provide for a substantially equal distribution of the resiliency and thus promote smooth running, also to increase the durability of the tire by providing for ample ventilation to thereby dissipate the heat engendered by the traction, as more fully hereinafter set forth.

In the drawings—

Figure 1 is a side elevation of a portion of a tire constructed in accordance with our invention;

Fig. 2 is a plan view looking at the tread surface, the tread surface being partly broken away;

Fig. 3 is a detail sectional view on the line 3—3 of Fig. 1;

Figs. 4 and 5 are views similar to Fig. 2 showing slight modifications.

Our improved tire is solid except that it is provided with two circumferential series of passages $a$, $b$, extending entirely through the tire from side to side. The series of passages $a$ is adjacent to the rim side of the tire, and the other passages $b$ are arranged in a zone nearer the tread surface thereof. One series of passages is staggered with reference to the other series, the passages of this series being sufficiently wide to overlap the adjacent transverse edges of the other passages, thereby forming virtually two series of pillars, one series $c$ lying between the outer passages $b$ and the rim face of the tire, while the other series $d$ lies between the adjacent ends of the outer series of passages. Each of the passages is preferably approximately crescent-shaped in cross-section, their longitudinal edges being rounded at $e$, and the tread side of the passages being concaved toward the tread surface while the opposite walls of the passages are convexed in the same direction.

As shown in Figs. 1 and 2, the passages $a$ and $b$ extend obliquely across the tire, while in Fig. 4 the passages extend across the tire in a curved line. In Fig. 5 the passages are zigzag across. By arranging the passages in any one of these ways or any other equivalent way, it will be observed that under load strains the passages will be collapsed progressively, the collapsing beginning at one end of the passage and traveling toward the midlength of the passage, and that before each passage is collapsed to the fullest degree (which degree depends of course on the load) the next succeeding passage will begin to collapse. In other words, by thus inclining the passages across the tire, the load will at no time be altogether on one of the pillars or over one of the passages, but will at all times be distributed among the pillars, thereby eliminating a lumpy effect in running and thus promoting smooth running of the vehicle.

Extending circumferentially through the tire, adjacent to the arched walls of each series of passages, is a series of fabric strips $f$, $f'$ and adjacent to these strips or bands $f$, $f'$ is another series of bands $g$, $g'$ arranged in a serpentine manner in the body of the tire. These bands $f$ and $g$ and $f'$ and $g'$ are desirably constructed of single cords lying side by side, but they may be formed of a woven fabric, if desired. The serpentine bands $g$ dip toward the rim side of the tire at points $h$ adjacent to the arch of each of the passages $a$, and between these points $h$ the bands curve outwardly toward the tread surface and conform substantially to the curvature of the inner wall of the adjacent outer passages $b$. The outer serpentine bands $g'$ are arranged in the same manner. Through the tread surface of the tire extends a breaker strip $i$ which lies close to the outer bends of the bands $g'$. The arrangement of bands described is intended for the purpose of resisting collapsing and compressing strains and to at the same time distribute the strains among as many pillars $c$ and $d$ as is possible. The bands are all drawn taut in the process of making the tire, so that as each passage is collapsed, or partly collapsed, by the load, it will be observed that the forcing of the inwardly-dipping parts of the bands toward the rim causes the bands to transmit the strains to the adjacent pillars, thus not only resisting any collapsing tendency but also greatly increasing resiliency.

In addition to the reinforcing cords or bands we have described, it is obvious that we may employ the spiral arrangement of bands shown in Patents Nos. 1,277,953 and 1,277,789, dated September 3, 1918.

It will be further understood that the inwardly-dipped portions $h$ of the bands may be given an extra degree of tautness in the manner set forth in our said co-pending application, if desired.

The nature and scope of the invention having been thus indicated and its preferred embodiment having been specifically described, what is claimed as new is:

A cushion tire provided with a circumferential series of transverse passages and a band of fibrous material embedded in the tire between said passages and the tread surface thereof, said passages having their outer walls arched toward the tread surface and said bands being dipped inwardly toward said arched walls.

In testimony whereof we hereunto affix our signatures this 7 day of Mar. 1918.

FREDERICK AUGUSTUS KRUSEMARK.
LUTHER G. FUNKHOUSER.
HARRY G. CARPENTER.